United States Patent
Lee

(10) Patent No.: US 9,848,469 B2
(45) Date of Patent: Dec. 19, 2017

(54) LIGHTING APPARATUS AND SYSTEM HAVING ELECTRICAL INSULATION STRUCTURE BETWEEN DIMMER AND DRIVER

(71) Applicant: LG INNOTEK CO., LTD., Seoul (KR)

(72) Inventor: Yong Hee Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 15/379,754

(22) Filed: Dec. 15, 2016

(65) Prior Publication Data

US 2017/0171928 A1    Jun. 15, 2017

(30) Foreign Application Priority Data

Dec. 15, 2015  (KR) .......................... 10-2015-0179308

(51) Int. Cl.
*H05B 37/02*  (2006.01)
*H05B 33/08*  (2006.01)
(Continued)

(52) U.S. Cl.
CPC .... *H05B 33/0815* (2013.01); *H02M 3/33523* (2013.01); *H05B 33/0845* (2013.01); *H02M 3/337* (2013.01); *H05B 37/0254* (2013.01)

(58) Field of Classification Search
CPC ............ H05B 33/0815; H05B 33/0824; H05B 33/0845; H05B 33/0851
(Continued)

(56) References Cited

U.S. PATENT DOCUMENTS 8,461,766 B2    6/2013 Nerone
2009/0184662 A1*   7/2009 Given ................ H05B 33/0815
                                                    315/294
(Continued)

FOREIGN PATENT DOCUMENTS

EP      2 854 481 A1    4/2015
JP      2011-510475 A   3/2011
(Continued)

OTHER PUBLICATIONS

European Search Report regarding European Patent Application No. 16204517.3 dated Apr. 12, 2017.
(Continued)

*Primary Examiner* — Tung X Le
(74) *Attorney, Agent, or Firm* — LRK Patent Law Firm

(57) ABSTRACT

A lighting apparatus having an electrical insulation structure of a dimmer and a driver includes: an input power supply unit; a converter for converting input power into lighting unit supply power; a lighting unit applied with the lighting unit supply power to emit light; a dimmer for inputting a dimming signal for controlling the lighting unit; a PWM generation unit for receiving the dimming signal and generating a PWM signal; and a PWM control unit for controlling the lighting unit supply power according to the PWM signal, in which the input power supply unit, the converter, the lighting unit and the PWM control unit are connected to a first ground, the dimmer and the PWM generation unit are connected to a second ground, and the first ground is electrically separated from the second ground.

13 Claims, 5 Drawing Sheets

(51) Int. Cl.
*H02M 3/335* (2006.01)
*H02M 3/337* (2006.01)

(58) Field of Classification Search
USPC .................................. 315/209 R, 294, 307
See application file for complete search history.

(56) References Cited

U.S. PATENT DOCUMENTS

| | | | |
|---|---|---|---|
| 2012/0007512 A1 | 1/2012 | Kim et al. | |
| 2012/0056552 A1* | 3/2012 | Yu | H05B 33/0815 315/245 |
| 2012/0212142 A1 | 8/2012 | Ryu et al. | |
| 2012/0319610 A1* | 12/2012 | Yoshinaga | H05B 33/0848 315/210 |
| 2013/0300310 A1* | 11/2013 | Hu | H05B 33/0854 315/239 |
| 2014/0125248 A1 | 5/2014 | Hu | |
| 2014/0340295 A1* | 11/2014 | Zhang | H05B 33/0809 345/102 |
| 2015/0002044 A1 | 1/2015 | Han et al. | |
| 2015/0091459 A1* | 4/2015 | Kato | H02M 3/33553 315/200 R |
| 2016/0073457 A1* | 3/2016 | Nakajo | H05B 33/0815 315/223 |
| 2016/0105939 A1* | 4/2016 | Lee | H05B 33/0845 315/201 |

FOREIGN PATENT DOCUMENTS

| | | |
|---|---|---|
| JP | 2011-510475 A5 | 6/2012 |
| JP | 2012-209052 A | 10/2012 |
| JP | 2015-070697 A | 4/2015 |
| KR | 2015-0060455 A | 6/2015 |

OTHER PUBLICATIONS

JPO Office Action regarding Japanese Patent Application No. 2016-243218, dated Sep. 21, 2017, which corresponds to the above-referenced U.S. application.

* cited by examiner (a)

(b)

LIGHTING APPARATUS AND SYSTEM HAVING ELECTRICAL INSULATION STRUCTURE BETWEEN DIMMER AND DRIVER

CROSS REFERENCE TO RELATED APPLICATION

The present application claims the benefit of Korean Patent Application No. 10-2015-0179308 filed in the Korean Intellectual Property Office on Dec. 15, 2015, the entire contents of which are incorporated herein by reference.

BACKGROUND OF THE PRESENT INVENTION

1. Field of the Present Invention

The present invention relates to a lighting apparatus having an electrical insulation structure of a dimmer and a driver, the apparatus including: an input power supply unit; a converter for converting input power into lighting unit supply power; a lighting unit applied with the lighting unit supply power to emit light; a dimmer for inputting a dimming signal for controlling the lighting unit; a PWM generation unit for receiving the dimming signal and generating a PWM signal; and a PWM control unit for controlling the lighting unit supply power according to the PWM signal, in which the input power supply unit, the converter, the lighting unit and the PWM control unit are connected to a first ground, the dimmer and the PWM generation unit are connected to a second ground, and the first ground is electrically separated from the second ground.

2. Description of Related Art

A light emitting diode (LED) is a kind of semiconductor device for converting electrical energy into light. The LED has advantages of low power consumption, semi-permanent lifespan, fast response time, safety and eco-friendliness compared with existing light sources such as a fluorescent lamp, an incandescent lamp and the like. Particularly, an LED lighting apparatus may carry out various performances by controlling the order of turning on and off LEDS installed in a plurality of arrays, colors and brightness of emitted light, and the like.

Therefore, a lot of studies are under progress to substitute LEDs for a conventional light source, and use of the LEDs as a light source of various lighting apparatuses used indoor or outdoor, such as lamps, LCD devices, electronic signboards, street lamps and the like, is on the rise. Particularly, the LEDS are used for general lighting of indoor interiors, stage lighting for making a specific atmosphere, advertisement lighting, landscape lighting and the like.

A lighting apparatus may be installed on an outer wall of a building, in a park, on the street as a street lamp, on a bridge rail, in a theater and the like as a landscape lighting apparatus, and the size and applied system may vary according to applied purposes, targets or positions. That is, a lighting apparatus for an outer wall of a building is used to be simply displayed on the outer wall of a building in the shape of a stripe just for blinking in an single or combined color, and lighting apparatuses installed in a park, on a street, on a bridge rail or the like are irregularly installed according to the shape of a target object to blink or change colors.

In addition, LED lighting is rapidly distributed owing to a long lifespan and high efficiency compared with conventional lighting, and dimmers capable of changing illuminance according to change of climate and time are commercialized. Control methods of the dimmers can be divided into wireless and wired communication methods, and particularly, when a wireless communication method is used, brightness is adjusted by handling a Dim(+−) line in each driver.

In addition, dimming control of a lighting apparatus diversely used in a variety of fields recently should be performed quite precisely. This is more than simply turning on and off a lighting apparatus, and it is required to precisely control the lighting apparatus at a variety of illuminance levels such as low, low-medium, medium, medium-high, high and the like according to the requirement of a user.

Meanwhile, a dimmer and an LED driver should be electrically connected for wired dimming control of a lighting apparatus. In the case of a conventional lighting apparatus, there exists a potential danger of a defect since the ground of the dimmer is electrically connected (equal potential) to an LED lighting unit due to the electrical connection.

At this point, a condition of connecting one dimmer to several LED drivers and LED lighting units exists as a general field implementation condition, and there may be a state in which a plurality of unintentionally connected LED lighting units has the same common potential. Accordingly, if a separate interface for handling the dimmer does not exist, there may be a problem of flowing leakage current of the LED lighting units through a human body when a user handles the dimmer.

SUMMARY OF THE PRESENT INVENTION

Therefore, the present invention has been made in view of the above problems, and it is an object of the present invention to provide a lighting apparatus for preventing leakage current of an LED lighting unit by separating a dimmer and the ground of a driver.

The technical objects to be accomplished by the present invention are not limited to the technical objects mentioned above, and various technical objects may be included within a scope apparent to those skilled in the art.

To accomplish the above object, according to one aspect of the present invention, there is provided a lighting apparatus having an electrical insulation structure of a dimmer and a driver, the apparatus comprising: an input power supply unit; a converter for converting input power into lighting unit supply power; a lighting unit applied with the lighting unit supply power to emit light; a dimmer for inputting a dimming signal for controlling the lighting unit; a PWM generation unit for receiving the dimming signal and generating a PWM signal; and a PWM control unit for controlling the lighting unit supply power according to the PWM signal, wherein the input power supply unit, the converter, the lighting unit and the PWM control unit are connected to a first ground, the dimmer and the PWM generation unit are connected to a second ground, and the first ground is electrically separated from the second ground.

In addition, in the lighting apparatus having an electrical insulation structure of a dimmer and a driver according to an embodiment of the present invention, the converter includes: a first transistor and a second transistor connected to the PWM control unit; and a first transformer for transforming the input power according to the first transistor and the second transistor.

In addition, in the lighting apparatus having an electrical insulation structure of a dimmer and a driver according to an embodiment of the present invention, the dimmer inputs at least any one dimming signal among a 0 to 10V dimming signal, a 1 to 10V dimming signal and a PWM dimming signal.

In addition, the lighting apparatus having an electrical insulation structure of a dimmer and a driver according to an embodiment of the present invention further comprises a first filter including: a first resistor connected to the dimmer in series; and a first capacitor connected to the first resistor in parallel, wherein the first filter removes noise of the dimming signal.

In addition, in the lighting apparatus having an electrical insulation structure of a dimmer and a driver according to an embodiment of the present invention, the PWM generation unit includes a comparator for generating the PWM signal by comparing the dimming signal and an input signal. At this point, the input signal is a sawtooth pulse or a chopping pulse.

In addition, the lighting apparatus having an electrical insulation structure of a dimmer and a driver according to an embodiment of the present invention further comprises a bias power supply including a second transformer, a rectifier and a capacitor, wherein the comparator is supplied with driving power from the bias power supply. At this point, the bias power supply is connected to the second ground.

In addition, in the lighting apparatus having an electrical insulation structure of a dimmer and a driver according to an embodiment of the present invention, the PWM generation unit further includes a photocoupler connected between an output terminal of the PWM generation unit and a conversion unit to convert the PWM signal.

At this point, in the lighting apparatus having an electrical insulation structure of a dimmer and a driver according to an embodiment of the present invention, the PWM generation unit further includes a second filter including: a second resistor connected to the photocoupler in series; and a second capacitor connected to the second resistor in parallel, wherein the second filter removes noise of the inverted PWM signal.

In addition, the lighting apparatus having an electrical insulation structure of a dimmer and a driver according to an embodiment of the present invention further comprises a feedback control unit connected between the PWM control unit and the lighting unit in a form of feedback.

In addition, the lighting apparatus having an electrical insulation structure of a dimmer and a driver according to an embodiment of the present invention further comprises an amplifier including: a first input terminal for receiving a current value or a voltage value of an output terminal of the converter; and a second input terminal for receiving the PWM signal, wherein the amplifier amplifies the PWM signal.

At this point, in the lighting apparatus having an electrical insulation structure of a dimmer and a driver according to an embodiment of the present invention, the first input terminal receives the current value and the voltage value of the output terminal of the converter through an OR gate. In addition, the lighting apparatus having an electrical insulation structure of a dimmer and a driver according to an embodiment of the present invention further comprises a conversion unit for converting the PWM signal into a reference value to input the PWM signal into the amplifier.

On the other hand, a lighting system having an electrical insulation structure of a dimmer and a driver according to an embodiment of the present invention comprises: the dimmer for inputting a dimming signal for controlling a lighting apparatus; and at least one or more lighting apparatuses for receiving the dimming signal, generating a PWM signal and dimming a lighting unit according to the PWM signal, wherein the lighting apparatus is connected to a first ground, the dimmer is connected to a second ground, and the first ground and the second ground are electrically separated.

DETAILED DESCRIPTION OF THE PREFERRED EMBODIMENT

Figure 1:
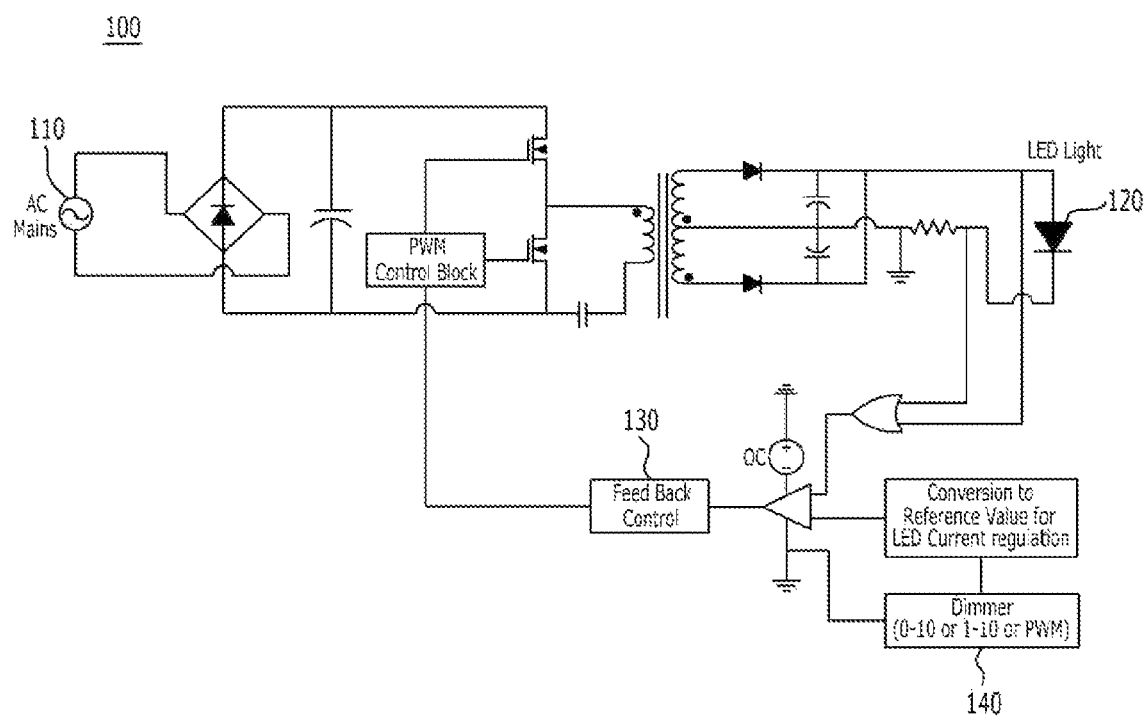
FIG. 1 is a view showing the configuration of a conventional lighting apparatus.

Hereinafter, a 'lighting apparatus and system having an electrical insulation structure of a dimmer and a driver' according to the present invention will be described in detail with reference to the accompanying drawings. The disclosed embodiments are provided to enable those skilled in the art to easily understand the scope of the present invention, and the present invention is not limited by such embodiments. Moreover, matters illustrated in the drawings are schematized in order to describe or explain the embodiments of the present invention more easily and hence may be different from actually embodied forms.

Meanwhile, the constitutional components expressed below are merely examples for implementing the present invention. Accordingly, other constitutional components may be used in other implementations of the present invention without departing from the spirit and scope of the present invention.

In addition, the expression of 'including' a component is an expression of an 'open type' which merely refers to existence of a corresponding component, and it should not be construed as precluding additional components.

In addition, the expressions such as 'first', 'second' and the like are expressions used only to distinguish a plurality of constitutions and do not limit the sequence or other features of the constitutions.

In addition, the term 'power supply' of the present invention may include all kinds of electrical energy that can be used in a general electrical circuit, such as 'voltage', 'power', 'current' and the like.

FIG. 1 is a view showing the configuration of a conventional lighting apparatus.

Referring to FIG. 1, a conventional lighting apparatus 100 may include an input power supply unit 110, a lighting unit 120, a feedback control unit 130 and a dimmer 140.

At this point, the dimmer of the conventional lighting apparatus directly inputs a dimming signal into the feedback control unit or a PWM control unit and is directly and electrically connected to a converter, the lighting unit or the like. Accordingly, an electrical connection is generated between the ground and the lighting unit, and there may be a state of common potential when the dimmer is connected to a plurality of LED lighting units.

Accordingly, there may be a problem of flowing leakage current of the lighting unit through a human body when a user handles the lighting apparatus, and this may be a disadvantage in a variety of aspects such as the lifespan, stability, performance and the like of the lighting apparatus.

The lighting apparatus of the present invention solves the problems of the conventional lighting apparatus by using different grounds for the dimmer and the driver, connecting the driver to a first ground and the dimmer to a second ground, and electrically separating the first ground and the second ground. Details thereof will be described with reference to FIGS. 2 to 6.

Figure 2:
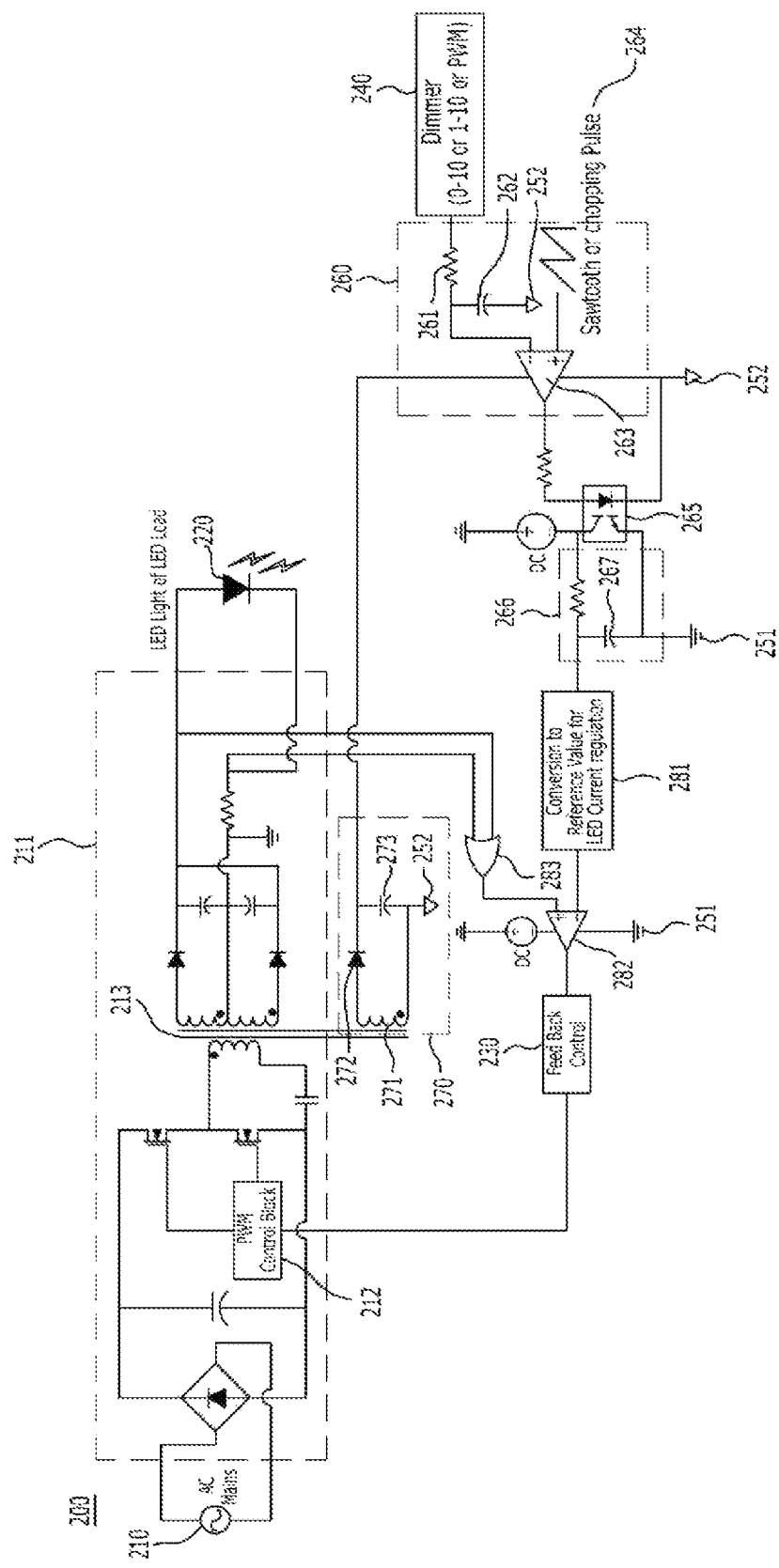
FIG. 2 is a view showing the configuration of a lighting apparatus having an electrical insulation structure of a dimmer and a driver according to an embodiment of the present invention.

FIG. 2 is a view showing the configuration of a lighting apparatus having an electrical insulation structure of a dimmer and a driver according to an embodiment of the present invention.

Referring to FIG. 2, a lighting apparatus 200 of the present invention may include an input power supply unit 210, a converter 211, a lighting unit 220, a dimmer 240, a PWM generation unit 260 and a PWM control unit 212.

The input power supply unit 210 supplies overall input power of the lighting apparatus. At this point, the input power input into the input power supply unit 210 is preferably 220V commercial power, and the 220V commercial power may have a sine wave form periodically alternating between −311V and +311V. More specifically, the input power supply unit may perform a function of supplying power to various elements used in the lighting apparatus.

The converter 211 converts the input power into lighting unit supply power. The converter performs a power control function of receiving main power and converting the main power to supply stable and efficient power requested from the system. Particularly, the converter of the present invention may be implemented as an AC/DC converter for converting AC power to DC power and may perform AC/DC conversion using various rectifying circuits, such as a diode rectifier, a phase control rectifier, a bridge rectifier and the like, and a plurality of switches and transformers to accomplish desired power conversion while minimizing power loss.

More specifically, the converter 211 may include a first transistor, a second transistor and a first transformer 213. The first transistor and the second transistor are connected to the PWM control unit to perform a switching operation according to a PWM signal of the PWM control unit, and the transformer transforms the input power at a turn ratio according to the switching operation.

The PWM control unit 212 controls the lighting unit supply power according to the PWM signal. The PWM control unit receives the PWM signal generated by the PWM generation unit and controls the lighting unit according to the PWM signal. Particularly, the PWM control unit performs pulse width modulation to obtain energy of the transformer and may perform PWM or frequency modulation as much as a needed cycle (duty) or frequency.

The lighting unit 220 is applied with the lighting unit supply power and emits light. The converter converts the input power into the lighting unit supply power and applies the converted power to the lighting unit. Particularly, the lighting unit 220 of the present invention may be configured of a light emitting diode (LED). The LED is a light source based on semiconductor, which is a light source generally and widely used as it has various advantages such as low price, long lifespan, small size, eco-friendly waste disposal, low consumption of energy, high efficiency, linearity and the like.

The dimmer 240 inputs a dimming signal for controlling the lighting unit. Such a dimmer is a device for changing intensity, illuminance or color of a lamp by continuously increasing or decreasing them, and both wired handling and wireless handling (remote handling) are allowed.

Particularly, the dimmer of the present invention inputs at least any one dimming signal among a 0 to 10V dimming signal, a 1 to 10V dimming signal and a PWM dimming signal. The 0 to 10V dimming signal controls the lighting unit by varying voltage of a control line from 0V to 10V, and the 1 to 10 dimming signal controls by varying the voltage from 1V to 10V. In addition, the PWM dimming signal adjusts current amount by modulating the width of a frequency which control the power. The dimmer of the present invention may be used by inputting various generally used dimming signals, in addition to the dimming signals described above.

In addition, a first filter 261 and 262 may remove noise from the dimming signal input by the dimmer of the present invention. The first filter includes a first resistor 261 connected to the dimmer in series and a first capacitor 262 connected to the first resistor in parallel and may perform an RC noise reduction filter (low-pass filter).

Figure 3:
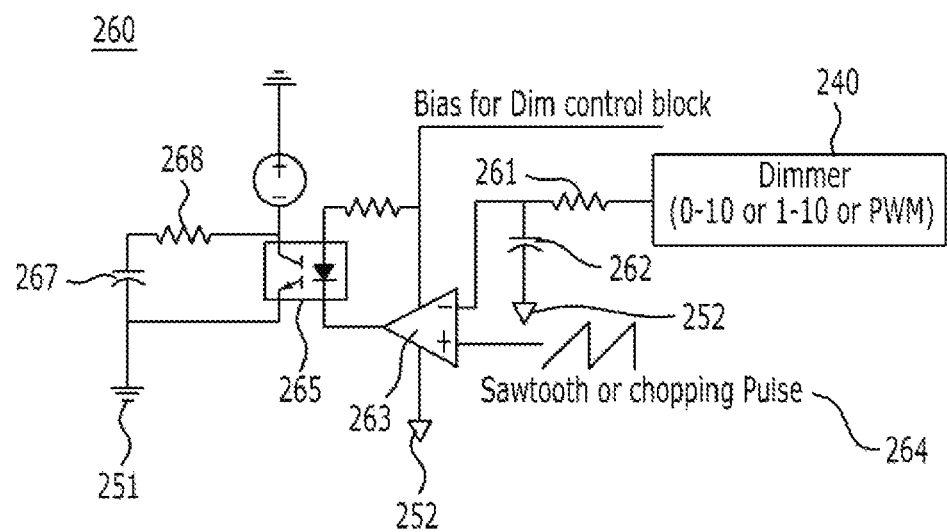
FIGS. 3 and 4 are exemplary views showing a dimmer and a PWM generation unit of a lighting apparatus having an electrical insulation structure of a dimmer and a driver according to an embodiment of the present invention.
Figure 4:
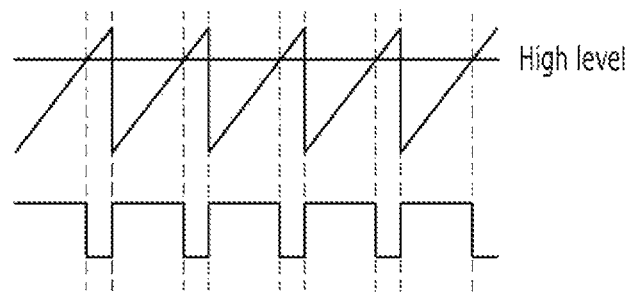
Figure 4:
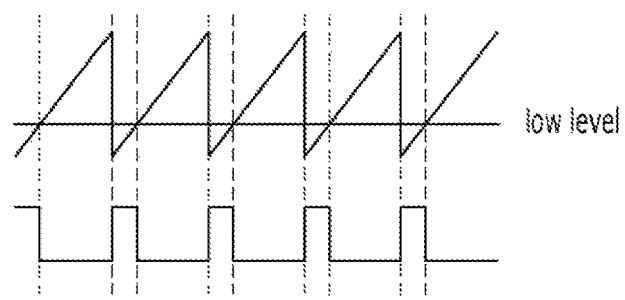

The PWM generation unit 260 receives the dimming signal from the dimmer and generates a PWM signal. The dimming signal configured of an analog signal or a PWM signal is converted into the PWM signal to be used for dimming control of the lighting unit. FIGS. 3 and 4 are exemplary views showing a dimmer and a PWM generation unit of a lighting apparatus having an electrical insulation structure of a dimmer and a driver according to an embodiment of the present invention.

Referring to FIG. 3, a dimming signal of the dimmer may pass through the first filter or directly input into a comparator 263. At this point, the comparator 263 may generate a PWM signal by comparing the dimming signal and an input signal. Generally, the comparator determines whether there is a difference in size, order, characteristic or the like by comparing two methods of expressing certain information. Particularly, the comparator evaluates a plurality of signals and generates a PWM signal of a high or low level at the output terminal.

More specifically, the comparator receives the dimming signal at one end of an input terminal and the input signal at the other end of the input terminal and compares the two signals. At this point, the input signal is a sawtooth pulse or a chopping pulse. In addition, if a difference between a signal input into the (+) terminal of the comparator and a signal input into the (−) terminal is a positive number, the PWM signal is inverted to a high level, and if the difference of the signals is a negative number, the PWM signal is inverted to a low level.

Referring to FIG. 4, a cycle width of the PWM signal generated when the dimming signal and the input signal are input into the comparator can be confirmed. In (a) of FIG. 4, it may be confirmed that the cycle width of the generated PWM signal is a high cycle width by comparing a dimming signal of a high level with the sawtooth pulse. In addition, in (b) of FIG. 4, it may be confirmed that the cycle width of the generated PWM signal is a low cycle width by comparing a dimming signal of a low level with the sawtooth pulse.

For example, when the dimming signal is an 8V signal of the 0 to 10V signal, a PWM signal of 80% of the cycle width may be generated after the dimming signal is compared with the sawtooth pulse. In addition, if the dimming signal is a 2V signal, a PWM signal of 20% of the cycle width may be generated after the dimming signal is compared with the sawtooth pulse. Accordingly, the cycle width of the PWM signal may also be adjusted by adjusting the level of the dimmer.

In addition, the PWM generation unit may further include a photocoupler 265 connected between the output terminal of the PWM generation unit and a conversion unit to convert the PWM signal. The photocoupler is a device for combining an electrical signal with light, in which a light emitting unit and a light receiving unit are electrically insulated from each other. In addition, since the photocoupler uses light, it may generate low noise, insulate current among devices configuring the system, and separately ground each device. The photocoupler of the present invention may include a photodiode for receiving the PWM signal output from the comparator and a phototransistor for converting a light signal of the photodiode into an electrical signal.

Particularly, the photocoupler of the present invention may invert the generated PWM signal. When the PWM signal is generated at a high-low-high-low-high level, a value applied on the top of the phototransistor of the photocoupler may be inverted to a low-high-low-high-low level.

At this point, a second filter 266 may remove noise from the PWM signal generated by the photocoupler of the present invention. The second filter includes a second resistor 268 connected to the dimmer in series and a second capacitor 267 connected to the second resistor in parallel and may perform an RC noise reduction filter (low-pass filter). The inverted PWM signal passing through the RC filter is changed to a DC value, and magnitude of the DC value may also be changed according to change of the size of the dimmer.

Meanwhile, the PWM generation unit of the present invention may be splitly connected to the first ground and the second ground. More specifically, the second filter and the phototransistor of the PWM generation unit may be connected to the first ground, and the dimmer 240, the first filter and the comparator 263 may be connected to the second ground. At this point, since the first ground and the second ground are electrically separated, the dimmer may be electrically insulated from the lighting apparatus. Accordingly, although a user operates the dimmer, possibility of current leakage due to leakage current may be lowered.

In addition, supply power of the comparator may also be separated by connecting to the second ground. Particularly, although a general power source may be used as the supply power, a separate bias power supply 270 may also be generated and used in the transformer of the lighting apparatus.

At this point, the bias power supply 270 of the present invention may include a second transformer, a rectifier and a capacitor. The second transformer is a connection of a winding wire from the transformer of the converter and is advantageous in that power may be transformed by using a commercial power supply as is. In addition, since the bias power supply transforms input power of the lighting apparatus, the bias power supply may also be connected to the second ground to be electrically insulated.

The feedback control unit 230 receives the PWM signal and is connected between the PWM control unit and the lighting unit in the form of feedback. In the case of feedback control, an error may be compensated by adjusting the pulse width to be large if the error value of the PWM signal is large and adjusting the pulse width to be small if the error value is small.

In addition, when the feedback control unit receives the PWM signal from the PWM generation unit, the PWM signal may pass through an amplifier 282. The amplifier 282 includes a first input terminal for receiving a current value or a voltage value of the output terminal of the converter and a second input terminal for receiving the PWM signal and may amplify the PWM signal.

The first input terminal may be configured as a (+) terminal of the amplifier and may receive a current value or a voltage value of the output terminal of the converter through an OR gate. The output terminal of the converter connected to the lighting unit may sense the current value or the voltage value depending on situation, and the PWM signal may control dimming of the lighting unit according to the current value or the voltage value. In addition, since the current value or the voltage value is input into the OR gate, the value may be input into the first input terminal if any one of the current value and the voltage value is satisfied.

The second input terminal may be configured as a (−) terminal of the amplifier and receives the PWM signal generated by the PWM generation unit. Particularly, the PWM signal may pass through the conversion unit 281 which converts the PWM signal into a reference value to input the PWM signal into the amplifier. Since the level of the current value or the voltage value of the output terminal of the converter may be different from the level of the PWM signal, the PWM signal may be amplified through the amplifier after passing through the conversion unit. For example, when the level of the PWM signal changes at a level of 0 to 10V as the voltage value of the output terminal of the converter changes at a level of 0 to 1V, the conversion unit lowers the PWM signal level by one tenth and inputs the PWM signal into the amplifier.

Figure 5:
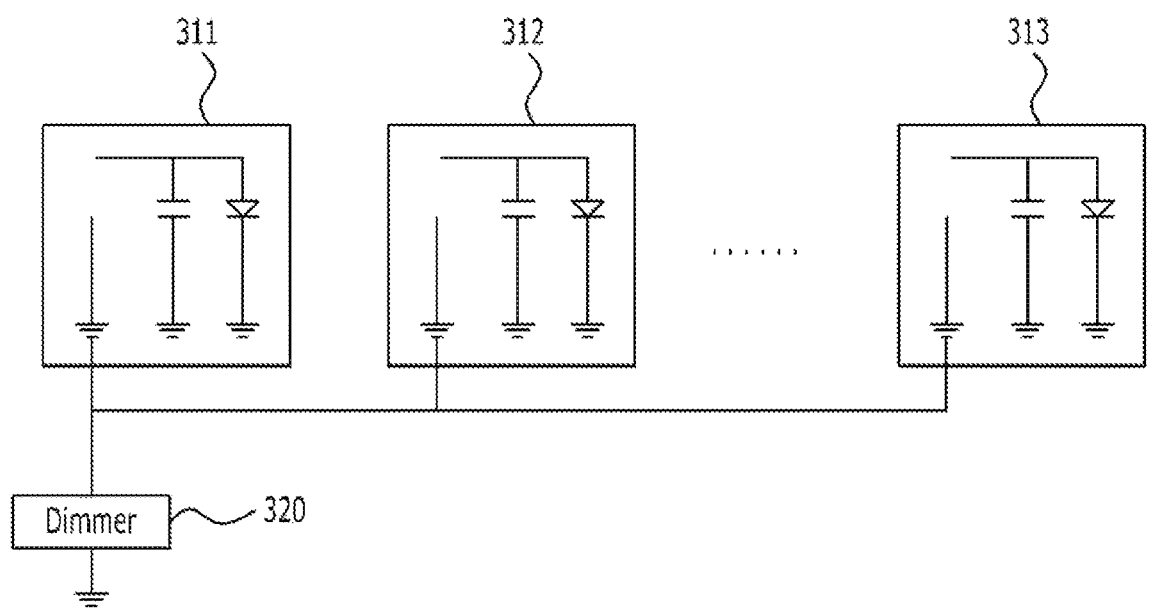
FIGS. 5 and 6 are exemplary views showing the configuration of lighting apparatuses of the conventional and present inventions having different grounds.
Figure 6:
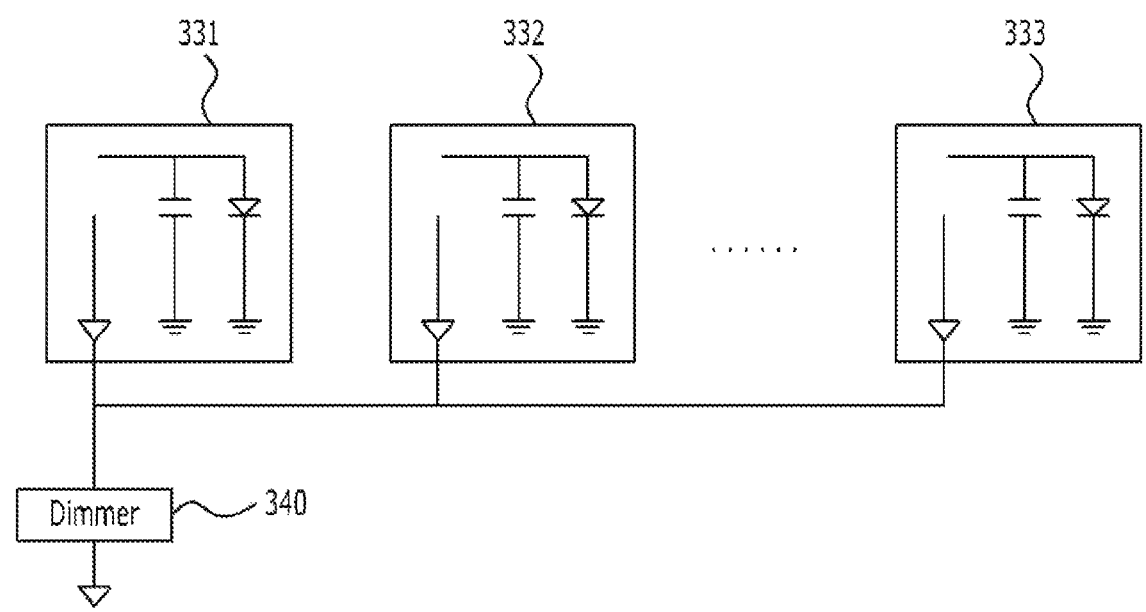

Meanwhile, FIGS. 5 and 6 are exemplary views showing the configuration of lighting apparatuses of the conventional and present inventions having different grounds. A lighting system of the present invention may include a dimmer 340 and at least one or more lighting apparatuses 331, 332 and 333, and the dimmer is electrically separated from the grounds of the lighting apparatuses.

Referring to FIG. 5, the dimmer 320 and grounds of a plurality of conventional lighting apparatuses 331, 332 and 333 are connected to each other. In addition, when a multi-lighting lamp and one dimmer are connected to each other, they use the same ground, and thus the current or voltage flowing through the lighting apparatus has a very high value. Particularly, when a plurality of lighting apparatuses are connected, they affect each other, and thus leakage current or voltage generated due to the affect needs to be prevented.

Referring to FIG. 6, in the lighting apparatus of the present invention, the dimmer 340 is separated from the grounds of a plurality of lighting apparatuses 331, 332 and 333. Since a first ground of the lighting apparatus and a second ground of the dimmer are independent from each other and leakage current of the LED luminaire does not flow into the dimmer, flow of leakage current through a human body generated by handling of a user may be prevented.

Since the lighting apparatus and system having an electrical insulation structure of a dimmer and a driver of the present invention electrically separates a conventional secondary ground and a dimming control unit from each other, potential defective factors can be removed.

More specifically, the lighting apparatus and system having an electrical insulation structure of a dimmer and a driver of the present invention may minimize damage affected by external lightning and surge noise. Further, flow of leakage current of the LED luminaire into the dimmer can be fundamentally prevented.

In addition, although a conventional lighting apparatus accumulates the amount of leakage current and limits permitted capacity of the dimmer since two or more LED luminaires are connected to one dimmer, the lighting apparatus and system having an electrical insulation structure of a dimmer and a driver of the present invention does not flow leakage current into the dimmer, and thus although two or more LED luminaires are connected, the lighting apparatus and system may be used without the limit of permitted capacity of the dimmer determined due to the leakage current.

In addition, since the lighting apparatus and system having an electrical insulation structure of a dimmer and a driver of the present invention does not flow leakage current of the LED luminaire into the dimmer, flow of leakage current through a human body generated by handling of a user may be prevented.

The embodiments of the present invention described above are disclosed for illustrative purposes, and the present invention is not limited thereto. In addition, those skilled in the art may make diverse modifications and changes within the spirit and scope of the present invention, and all the modifications and changes should be regarded as belonging to the scope of the present invention.

What is claimed is:

1. A lighting apparatus having an electrical insulation structure of a dimmer and a driver, the lighting apparatus comprising:
   an input power supply unit;
   a converter for converting input power into lighting unit supply power;
   a lighting unit applied with the lighting unit supply, power to emit light;
   the dimmer for inputting a dimming signal for controlling the lighting unit;
   a PWM generation unit for receiving the dimming signal and generating a PWM signal, wherein the PWM generation unit includes a photocoupler connected between an output terminal of the PWM generation unit and a conversion unit to convert the PWM signal; and
   a PWM control unit for controlling the lighting unit supply power according to the PWM signal,
   wherein the input power supply unit, the converter, the lighting unit and the PWM control unit are connected to a first ground, the dimmer and the PWM generation unit are connected to a second ground, and the first ground is electrically separated from the second ground.

2. The lighting apparatus according to claim 1, wherein the converter includes:
   a first transistor and a second transistor connected to the PWM control unit; and
   a first transformer for transforming the input power according, to the first transistor and the second transistor.

3. The lighting apparatus according to claim 1, wherein the dimmer inputs at least any one dimming signal among a 0 to 10V dimming signal, a 1 to 10V dimming signal and a PWM dimming signal.

4. The lighting apparatus according to claim 1, further comprising a first filter including:
   a first resistor connected to the dimmer in series; and
   a first capacitor connected to the first resistor in parallel,
   wherein the first filter removes noise of the dimming signal.

5. The lighting apparatus according to claim 1, wherein the PWM generation unit further includes a comparator for generating the PWM signal by comparing the dimming signal and an input signal.

6. The lighting apparatus according to claim 5, wherein the input signal is a sawtooth pulse or a chopping pulse.

7. The lighting apparatus according to claim 5, further comprising a bias power supply including a second transformer, a rectifier and a capacitor, wherein the comparator is supplied with driving power from the bias power supply.

8. The lighting apparatus according to claim 7, wherein the bias power supply is connected to the second ground.

9. The lighting apparatus according to claim 1,
   wherein the PWM generation unit further includes a second filter including:
   a second resistor connected to the photocoupler in series; and
   a second, capacitor connected to the second resistor in parallel,
   wherein the second filter removes noise of the inverted PWM signal.

10. The lighting apparatus according to claim 1, further comprising a feedback control unit connected between the PWM control unit and the lighting unit in a form of feedback.

11. A lighting apparatus having an electrical insulation structure of a dimmer and a driver, the lighting apparatus comprising:
    an input power supply unit;
    a converter for converting input power into lighting unit supply power;
    a lighting unit applied with the lighting unit supply power to emit light;
    the dimmer for inputting a dimming signal for controlling the lighting unit;
    a PWM generation unit for receiving the dimming signal and generating a PWM signal;
    a PWM control unit for controlling the lighting unit supply power according to the PWM signal; and
    an amplifier for amplifying the PWM signal,
    wherein the input power supply unit, the converter, the lighting unit and the PWM control unit are connected to a first ground, the dimmer and the PWM generation unit are connected to a second ground, and the first ground is electrically separated from the second ground, and
    wherein the amplifier includes:
    a first input terminal for receiving a current value or a voltage value of an output terminal of the converter; and
    a second input terminal for receiving the PWM.

12. The lighting apparatus according to claim 11, wherein the first input terminal receives the current value and the voltage value of the output terminal of the converter through an OR gate.

13. The lighting apparatus according to claim 11, further comprising a conversion unit for converting the PWM signal into a reference value to input the PWM signal into the amplifier.

* * * * *